(12) United States Patent
Kobayashi et al.

(10) Patent No.: US 12,216,314 B2
(45) Date of Patent: Feb. 4, 2025

(54) OPTICAL MODULE

(71) Applicant: AIO CORE CO., LTD., Tokyo (JP)

(72) Inventors: Shigeru Kobayashi, Tokyo (JP); Kazuhiro Shiba, Tokyo (JP); Mitsuru Kurihara, Tokyo (JP); Kazuhiko Kurata, Tokyo (JP)

(73) Assignee: AIO CORE CO., LTD., Tokyo (JP)

( * ) Notice: Subject to any disclaimer, the term of this patent is extended or adjusted under 35 U.S.C. 154(b) by 74 days.

(21) Appl. No.: 17/527,640

(22) Filed: Nov. 16, 2021

(65) Prior Publication Data
US 2022/0155537 A1    May 19, 2022

(30) Foreign Application Priority Data
Nov. 18, 2020    (JP) .................... 2020-191812

(51) Int. Cl.
*G02B 6/42*    (2006.01)

(52) U.S. Cl.
CPC ......... *G02B 6/4214* (2013.01); *G02B 6/4206* (2013.01)

(58) Field of Classification Search
CPC ....................................................... G02B 6/42
USPC ............................................................ 385/31
See application file for complete search history.

(56) References Cited

U.S. PATENT DOCUMENTS

| | | | |
|---|---|---|---|
| 7,565,043 B2 * | 7/2009 | Sugimoto | G02B 6/29368 385/14 |
| 10,101,546 B2 * | 10/2018 | Suzuki | G02B 6/4238 |
| 10,578,799 B2 * | 3/2020 | Doerr | G02B 6/4269 |
| 2002/0097962 A1 * | 7/2002 | Yoshimura | G02B 6/124 385/16 |
| 2004/0005119 A1 * | 1/2004 | Han | G02B 6/421 385/49 |
| 2005/0089262 A1 * | 4/2005 | Jenkins | G02B 6/423 385/83 |
| 2007/0189660 A1 * | 8/2007 | Sugimoto | G02B 6/29368 385/14 |

(Continued)

FOREIGN PATENT DOCUMENTS

| | | | | |
|---|---|---|---|---|
| CN | 101147088 A | * | 3/2008 | ............. G02B 6/30 |
| JP | S63-228107 A | | 9/1988 | |

(Continued)

OTHER PUBLICATIONS

Office Action issued in Japanese Application No. 2020-191812, dated Jul. 11, 2024.

(Continued)

*Primary Examiner* — Kaveh C Kianni
(74) *Attorney, Agent, or Firm* — MICHAEL BEST & FRIEDRICH LLP

(57) ABSTRACT

Provided is an optical module having high efficiency in optical coupling to a functional element on a substrate. An optical module includes: a first optical waveguide disposed parallel to a substrate; a condensing mirror configured to reflect and condense light propagated in the first optical waveguide toward the substrate; a second optical waveguide formed in a tapered shape narrowed toward the substrate, the second optical waveguide guiding the light reflected by the condensing mirror to the vicinity of the surface of the substrate; and an optical function unit disposed on the substrate such that the light emitted from the second optical waveguide is incident on the optical function unit.

10 Claims, 9 Drawing Sheets

(56) References Cited

U.S. PATENT DOCUMENTS

| | | | |
|---|---|---|---|
| 2016/0062063 A1* | 3/2016 | Ogura | G02B 6/305 264/1.27 |
| 2016/0164251 A1 | 6/2016 | Yashiki et al. | |
| 2017/0207600 A1* | 7/2017 | Klamkin | H01S 5/142 |
| 2021/0104637 A1 | 4/2021 | Amano et al. | |
| 2022/0291461 A1* | 9/2022 | Elsinger | G02B 6/124 |

FOREIGN PATENT DOCUMENTS

| | | | |
|---|---|---|---|
| JP | H06-313817 A | | 11/1994 |
| JP | 2000-066064 A | | 3/2000 |
| JP | 2001-051162 A | | 2/2001 |
| JP | 2004-029519 A | | 1/2004 |
| JP | 2007003782 A | * | 1/2007 |
| JP | 2007-256298 A | | 10/2007 |
| JP | 2008-262116 A | | 10/2008 |
| JP | 2015190991 A | * | 11/2015 |
| JP | 5919573 B2 | * | 5/2016 |
| JP | 2018084778 A | * | 5/2018 |
| WO | WO-2014/156962 A1 | | 10/2014 |
| WO | WO-2015/012213 A1 | | 1/2015 |
| WO | WO-2018-198490 A1 | | 11/2018 |

OTHER PUBLICATIONS

Office Action issued in Japanese Application No. 2020-191812, dated Nov. 8, 2024.

* cited by examiner

OPTICAL MODULE

TECHNICAL FIELD

The present invention relates to an optical module.

BACKGROUND ART

In a transmitter/receiver provided on a photoelectric hybrid substrate, an effective light-receiving area of a light-receiving element for detecting an optical signal becomes smaller as the speed increases. It is thus required that a highly efficient optical connection be achieved in a thin and limited space. Further, an ultraviolet (UV) absorption layer, which is indispensable in manufacturing of the photoelectric hybrid substrate, has been added to the upper surface of the light-receiving element on the photoelectric hybrid substrate; this UV absorption layer has however been a cause of an increased loss in optical coupling. Moreover, the photoelectric hybrid substrate is used together with other electric circuit boards, which leads to serious heat generation of semiconductor elements due to a high-speed operation, so that immersion cooling, which is immersion in an inert liquid, may be required. In this case, when a spatial optical system in air is in use, the medium is replaced from the air to the inert liquid. This causes a transition in the refractive index of the medium, and it is anticipated that light collection performance of a lens deteriorates, and operation failure occurs readily.

CITATION LIST

Patent Literature

PTL 1: WO2015/012213
PTL 2: WO2014/156962

SUMMARY OF INVENTION

Technical Problem

An object of the present invention, which has been made in view of the foregoing considerations, is to provide an optical module having high efficiency in optical coupling to a functional element on a substrate.

Solution to Problem

In order to solve the problems described above, one aspect of the present invention is an optical module including: a first optical waveguide disposed parallel to a substrate; a condensing mirror configured to reflect and condense light propagated in the first optical waveguide toward the substrate; a second optical waveguide formed in a tapered shape narrowed toward the substrate, the second optical waveguide guiding the light reflected by the condensing mirror to the vicinity of the surface of the substrate; and an optical function unit disposed on the substrate such that the light emitted from the second optical waveguide is incident on the optical function unit.

According to another aspect of the present invention, in the above aspect, the condensing mirror is a mirror formed on the end face of the first optical waveguide.

According to another aspect of the present invention, in the above aspect, the condensing mirror is a mirror having the end face of the first optical waveguide as a total reflective surface.

According to another aspect of the present invention, in the above aspect, the condensing mirror is an internal reflective surface of a prism disposed in contact with an emitting end face of the first optical waveguide.

According to another aspect of the present invention, in the above aspect, a metal film or a dielectric film is provided between the condensing mirror and air.

According to another aspect of the present invention, in the above aspect, the condensing mirror is disposed away from the emitting end face of the first optical waveguide, and a space between the condensing mirror and the emitting end face of the first optical waveguide is filled with a transparent solid medium.

According to another aspect of the present invention, in the above aspect, the optical module further includes a transparent film on the substrate, the second optical waveguide is erected vertically or obliquely to the surface of the substrate, the optical function unit is a light-receiving element, light emitted from the second optical waveguide is incident on the light-receiving element via the transparent film, and a diameter of the end of the second optical waveguide on the substrate side is smaller than an effective light-receiving diameter of the light-receiving element.

According to another aspect of the present invention, in the above aspect, the diameter of the end of the second optical waveguide on the substrate side is set such that a spot size of light emitted from the end on the light-receiving element is the same or substantially the same as the effective light-receiving diameter of the light-receiving element.

According to another aspect of the present invention, in the above aspect, the optical module further includes a transparent film on the substrate, the second optical waveguide is erected vertically or obliquely to the surface of the substrate, the optical function unit is a light-receiving element, the transparent film has a hole or a recess in a portion corresponding to the light-receiving element, and the end of the second optical waveguide on the substrate side is brought into the hole or the recess of the transparent film.

According to another aspect of the present invention, in the above aspect, the transparent film is a UV absorbing film.

Another aspect of the present invention is an optical module including: a first optical waveguide disposed parallel to a substrate; a second optical waveguide erected vertically or obliquely to the surface of the substrate; and a spherical or aspherical mirror that transmits light between the first optical waveguide and the second optical waveguide.

Advantageous Effects of Invention

According to the present invention, an optical module having high efficiency in optical coupling to a functional element on a substrate is achieved.

DESCRIPTION OF EMBODIMENTS

Hereinafter, embodiments of the present invention will be described in detail with reference to the drawings.

First Embodiment

Figure 1:
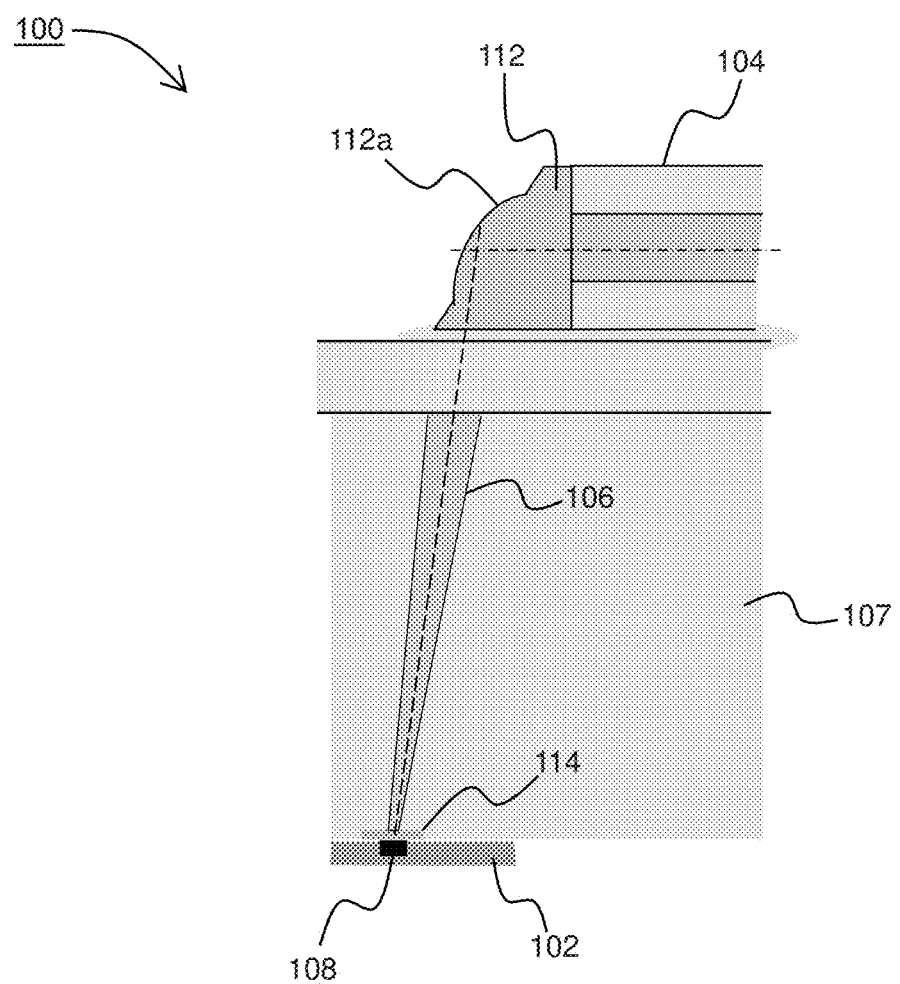
FIG. 1 is a cross-sectional configuration view of an optical module 100 according to a first embodiment of the present invention.

FIG. 1 is a cross-sectional configuration view of an optical module 100 according to a first embodiment of the present invention. An optical module 100 includes a substrate 102, a first optical waveguide 104, a second optical waveguide 106, a light-receiving element 108, and a prism 112. Although only one set of the first optical waveguide 104, the second optical waveguide 106, the light-receiving element 108, and the prism 112 are illustrated in FIG. 1 because FIG. 1 is a view of the optical module 100 from a direction of its cross-section, a plurality of sets of the first optical waveguide 104, the second optical waveguide 106, the light-receiving element 108, and the prism 112 may be disposed in a direction vertical to the cross-section in FIG. 1.

The substrate 102 is a silicon (Si) substrate or a silicon on insulator (SOI) substrate, and on its surface, the light-receiving element 108 and other functional elements are integrated by using silicon photonics technology. Examples of other functional elements include an optical modulator, a Si waveguide, a grating coupler, and the like. A semiconductor laser may be mounted on the substrate 102.

The second optical waveguide 106 having a high refractive index and a cladding layer 107 having a low refractive index are formed on the substrate 102. The second optical waveguide 106 is formed vertically or obliquely to the substrate 102 and is surrounded by the cladding layer 107. The angle of inclination of the second optical waveguide 106 to the substrate 102 is in the range of 0° to 10°, for example. The end of the second optical waveguide 106 on the substrate 102 side is located directly above the light-receiving element 108 such that light emitted from the end of the second optical waveguide 106 enters the light-receiving element 108. The second optical waveguide 106 erected on the substrate 102 can be produced for example by irradiating a UV curable resin, applied on the substrate 102 to have a predetermined thickness, with a thin UV light beam from the upper side of the substrate 102 to cure the UV curable resin into a columnar shape only in a portion through which the UV light beam has passed. In the aspect in which the second optical waveguide 106 is formed obliquely to the substrate 102, a UV absorbing film 114 for absorbing the UV light beam and preventing the reflection of the UV light beam is preferably formed in advance on the surface of the substrate 102 in order to avoid curing of even an unintended portion of the UV curable resin due to the UV light beam being reflected obliquely on the surface of the substrate 102.

On the end of the second optical waveguide 106 opposite to the substrate 102, a prism 112 is disposed such that one of two mutually perpendicular end faces thereof faces the substrate 102 side. Further, the first optical waveguide 104 is disposed in contact with the other of the two mutually perpendicular end faces of the prism 112 and in parallel with the substrate 102. The first optical waveguide 104 may be any type of optical waveguide, such as an optical fiber or a microfabricated waveguide of a polymer, glass, Si, or the like formed on the substrate 102.

With the configuration as described above, light propagated in the first optical waveguide 104 in a direction to the prism 112 is reflected (totally reflected) in the prism 112 by a slope 112a of the prism 112, enters the second optical waveguide 106, is emitted from the end on the opposite side of the second optical waveguide 106 (i.e., substrate 102 side), and is incident on the light-receiving element 108.

As the first optical waveguide 104, for example, a multimode optical waveguide (e.g., multimode optical fiber) having a core diameter of about 50 µm is used. On the other hand, generally, the light-receiving element 108 (photodiode) has a smaller capacitance as having a smaller light-receiving diameter and is thus capable of high-speed response. For example, a photodiode designed to be able to receive an optical signal of 10 Gbps has a light-receiving diameter of about 25 µm, and a photodiode for 50 Gbps has a light-receiving diameter of about 10 µm. Thus, the light-receiving diameter of the light-receiving element 108 capable of high-speed response is smaller than the core diameter of the first optical waveguide 104, so that it is required that light-receiving efficiency in the light-receiving element 108 (defined, for example, as the ratio of the power of the light taken into the light-receiving element 108 to the power of the light transmitted through the first optical waveguide 104) be prevented from decreasing.

For coupling the light transmitted through the first optical waveguide 104 to the light-receiving element 108 with high efficiency, the second optical waveguide 106 is formed into a tapered shape with its diameter decreasing toward the substrate 102. The light emitted from the first optical waveguide 104 has a spot size narrowed by passing through the second optical waveguide 106 in the shape as thus described, and the light is emitted from the end of the second optical waveguide 106 on the substrate 102 side. The light-receiving element 108 can receive the narrowed light entirely.

The taper angle of the second optical waveguide 106 (or the amount of change in the diameter per unit length of the second optical waveguide 106) is determined in accordance with the difference between the core diameter of the first optical waveguide 104 and the light-receiving diameter of the light-receiving element 108. However, when the taper angle is larger than a certain angle (i.e., when the amount of change in the diameter per unit length of the second optical waveguide 106 is larger than a predetermined certain value), some of a plurality of modes of light traveling in the second optical waveguide 106 toward the substrate 102 side may not be totally reflected at the interface between the second optical waveguide 106 and the cladding layer 107 but leak out of the second optical waveguide 106, that is, leak into the cladding layer 107. For example, when an internal reflective surface 112a of the prism 112 is a plane, such light leakage becomes more prominent. As thus described, it is difficult to completely prevent a decrease in light-receiving efficiency in the light-receiving element 108 only by using the second optical waveguide 106 with the tapered shape.

In order to reduce the leakage of light from the second optical waveguide 106 with the tapered shape into the cladding layer 107 even in the optical module 100 employing the light-receiving element 108 capable of high-speed response (i.e., the light-receiving element 108 having a small light-receiving diameter), the slope 112a of the prism 112 is formed as a spherical or aspherical convex surface (concave surface when viewed from the inside of the prism 112). That is, the internal reflective surface 112a of the prism 112 is configured to function as a spherical or aspherical condensing mirror. Hence the light emitted from the first optical waveguide 104 and reflected (totally reflected) by the internal reflective surface 112a of the prism 112 propagates in the second optical waveguide 106 as condensed light. Thereby, each mode of light traveling in the second optical waveguide 106 toward the substrate 102 side is incident at a shallower angle on the interface between the second optical waveguide 106 and the cladding layer 107 and is totally reflected at the interface. Therefore, even when the taper angle of the second optical waveguide 106 is large, that is, even when the light-receiving element 108 with a small light-receiving diameter is used, the leakage of light from the second optical waveguide 106 into the cladding layer 107 can be prevented or reduced, and as a result, light can be coupled from the second optical waveguide 106 to the light-receiving element 108 with high efficiency.

Second Embodiment

Figure 2:
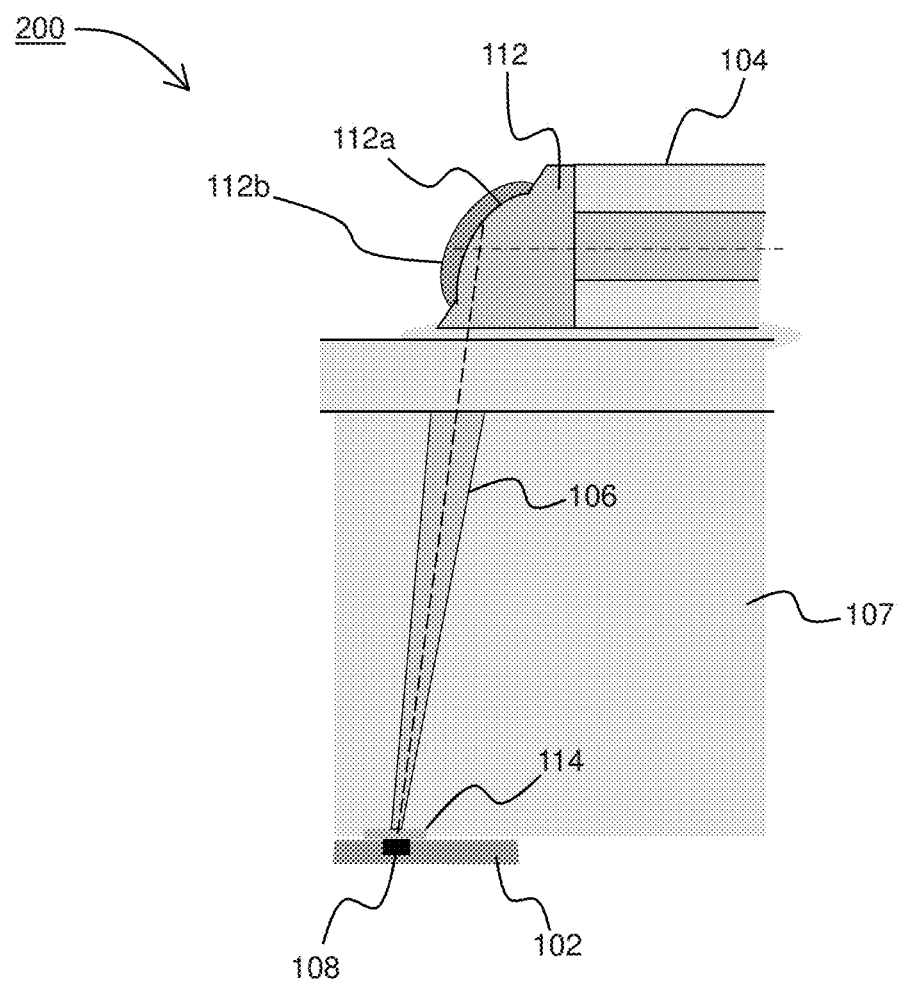
FIG. 2 is a cross-sectional configuration view of an optical module 200 according to a second embodiment of the present invention.

FIG. 2 is a cross-sectional configuration view of an optical module 200 according to a second embodiment of the present invention. In FIG. 2, the same components as those of the first embodiment described above are denoted by the same reference numerals. The optical module 200 includes a reflective film 112b on the outer surface of the reflective surface 112a of the prism 112. The reflective film 112b is, for example, a metal film or a dielectric multilayer film.

The optical module 200 can be mounted on an interposer substrate or a motherboard (not illustrated) together with various electric components and electric circuits (e.g., the light-receiving element 108 integrated or mounted on the substrate 102, an integrated circuit (IC) for operating a semiconductor laser, etc.). A photoelectric hybrid module thus assembled may be immersed in an inert liquid in actual use so as to efficiently cool the IC and the like that generate heat (immersion cooling). When the photoelectric hybrid module is immersed in the liquid, the liquid may also enter into the optical module 200, and the outer surface of the reflective surface 112a of the prism 112 may be covered with the liquid.

In the optical module 100 according to the first embodiment described above, with the reflective film 112b being not provided on the outer surface of the reflective surface 112a of the prism 112, the liquid having entered directly contacts the reflective surface 112a of the prism 112. Hence the liquid having a refractive index different from that of air exists at the interface of the prism 112, whereby the reflection angle of light on the reflective surface 112a of the prism 112 changes, and the light from the first optical waveguide 104 is not properly coupled to the second optical waveguide 106.

On the other hand, according to the optical module 200 of the second embodiment, the reflective film 112b provided on the prism 112 controls the reflection on the reflective surface 112a of the prism 112, and the inert liquid having entered into the module does not affect the propagation of light in the prism 112. Therefore, the photoelectric hybrid module mounted with the optical module 200 according to the second embodiment can be efficiently cooled by immersion cooling.

Third Embodiment

Figure 3:
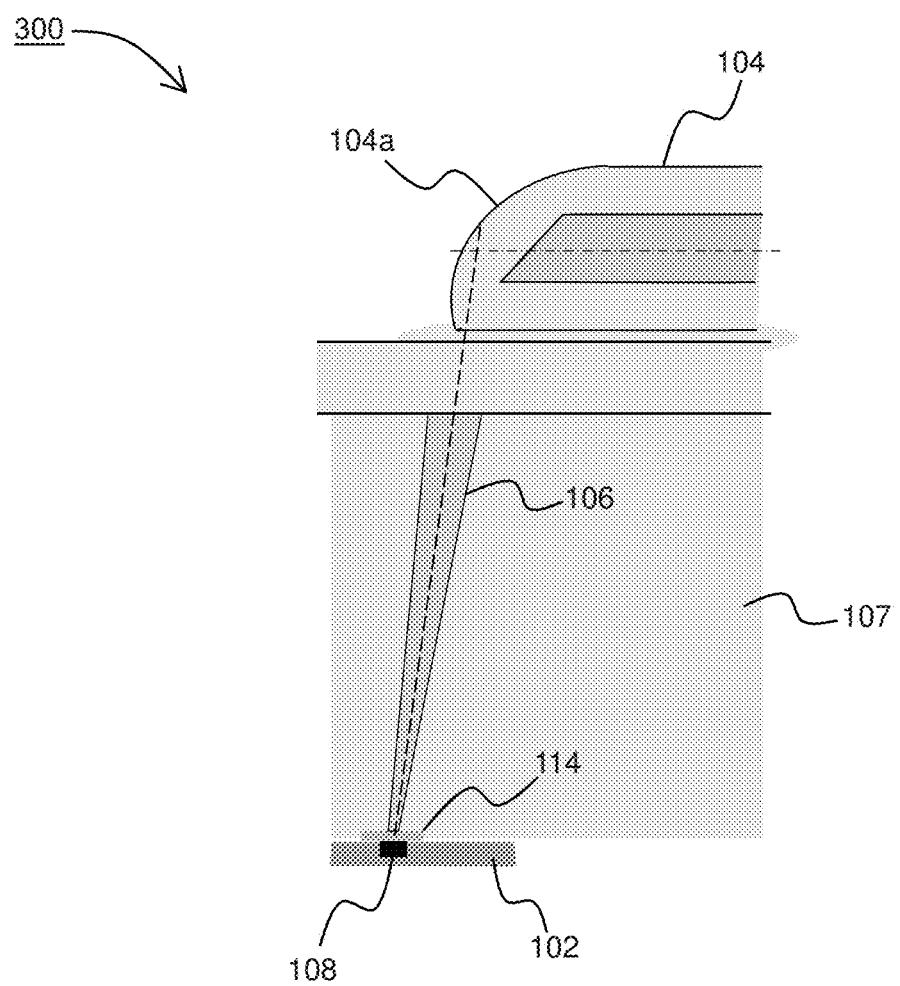
FIG. 3 is a cross-sectional configuration view of an optical module 300 according to a third embodiment of the present invention.

FIG. 3 is a cross-sectional configuration view of an optical module 300 according to a third embodiment of the present invention. In FIG. 3, the same components as those of the first embodiment described above are denoted by the same reference numerals. Instead of the prism 112, the optical module 300 includes a total reflection mirror 104a formed on the end face of the first optical waveguide 104.

The mirror 104a can be formed by polishing the end face of the first optical waveguide 104 to a spherical or aspherical convex surface. Thereby, the end face 104a of the first optical waveguide 104 functions as a spherical or aspherical condensing mirror. Therefore, the light traveling in the first optical waveguide 104 is reflected and condensed by the total reflection mirror 104a at the end face of the waveguide and travels through the second optical waveguide 106 in a direction to the substrate 102. Thus, as in the first embodiment, even when the taper angle of the second optical waveguide 106 is large, the leakage of light from the second optical waveguide 106 into the cladding layer 107 can be prevented or reduced, and as a result, light can be coupled from the second optical waveguide 106 to the light-receiving element 108 with high efficiency.

Fourth Embodiment

Figure 4:
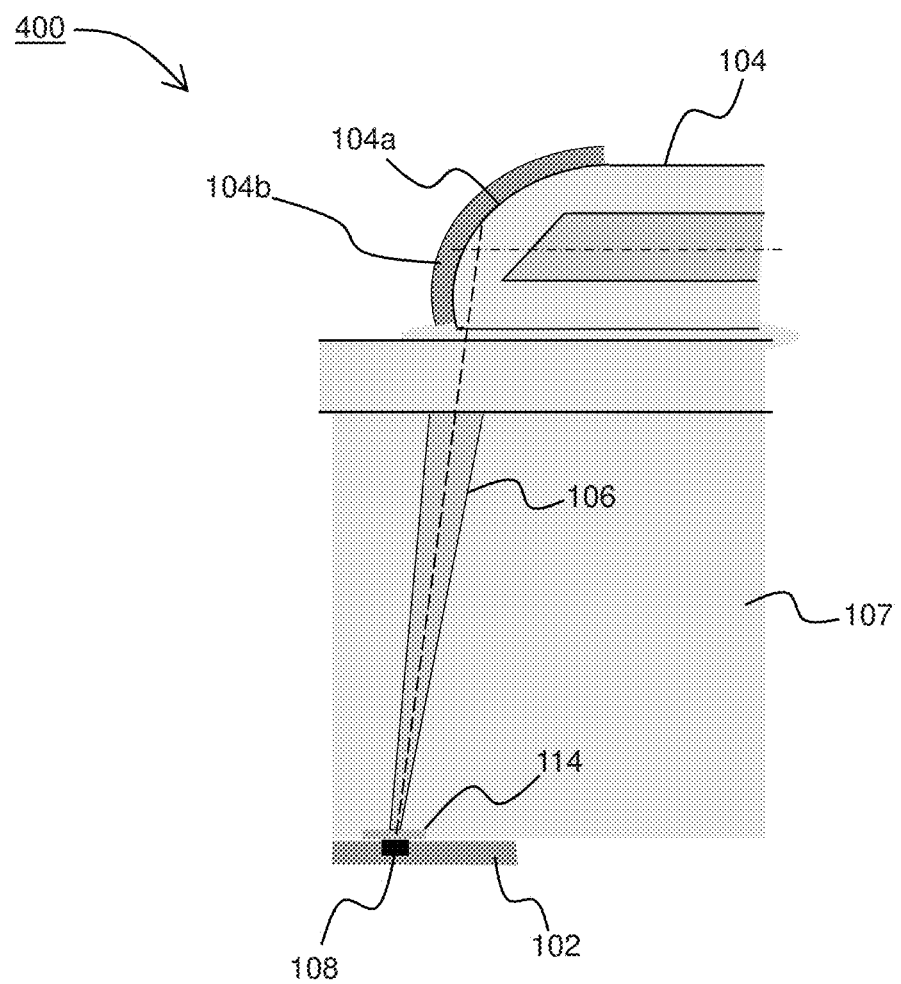
FIG. 4 is a cross-sectional configuration view of an optical module 400 according to a fourth embodiment of the present invention.

FIG. 4 is a cross-sectional configuration view of an optical module 400 according to a fourth embodiment of the present invention. In FIG. 4, the same components as those of the third embodiment are denoted by the same reference numerals. The optical module 400 includes a reflective film 104b on the outer surface of a total reflection mirror 104a formed on the end face of the first optical waveguide 104. The reflective film 104b is, for example, a metal film or a dielectric multilayer film.

As in the second embodiment described above, according to the optical module 400 of the fourth embodiment, the reflective film 104b formed on the end face of the first optical waveguide 104 controls the light reflection at the end face (i.e., mirror 104a), and the inert liquid having entered into the optical module 400 does not affect the light reflection at the end face. Therefore, the photoelectric hybrid module mounted with the optical module 400 according to the fourth embodiment can be efficiently cooled by immersion cooling.

Fifth Embodiment

Figure 5:
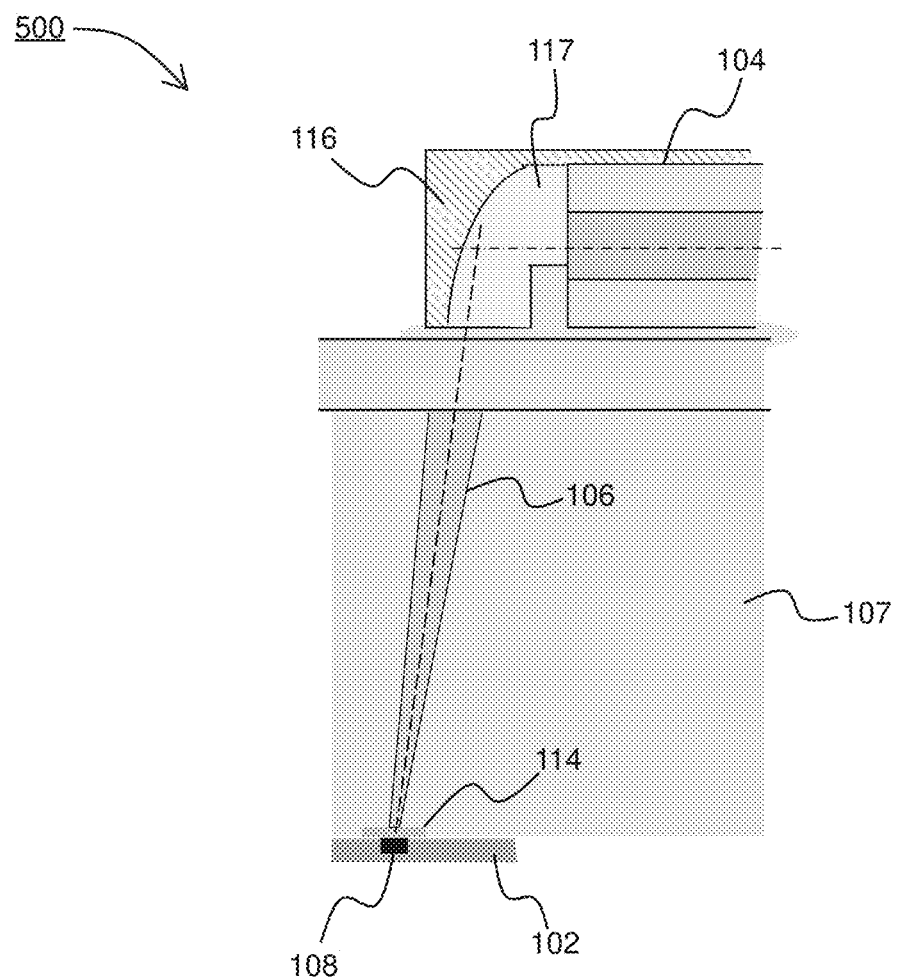
FIG. 5 is a cross-sectional configuration view of an optical module 500 according to a fifth embodiment of the present invention.

FIG. 5 is a cross-sectional configuration view of an optical module 500 according to a fifth embodiment of the present invention. In FIG. 5, the same components as those of the first embodiment are denoted by the same reference numerals. Instead of the prism 112, the optical module 500 includes a mirror 116 disposed away from the emitting end face of the first optical waveguide 104.

The mirror 116 may be, for example, a mirror obtained by mirror-polishing a metal member or a mirror obtained by forming a metal film or a dielectric multilayer film on the surface of a resin member. The reflective surface of the mirror 116 has a spherical or aspherical concave surface. That is, the mirror 116 is a spherical or aspherical condensing mirror. Hence the light emitted from the first optical waveguide 104 is reflected and condensed by the mirror 116 and travels through the second optical waveguide 106 in a direction to the substrate 102. Thus, as in the first embodiment, even when the taper angle of the second optical waveguide 106 is large, the leakage of light from the second optical waveguide 106 into the cladding layer 107 can be prevented or reduced, and as a result, light can be coupled from the second optical waveguide 106 to the light-receiving element 108 with high efficiency.

The space between the mirror 116 and the emitting end face of the first optical waveguide 104 is filled with a transparent medium 117 made of a solid, gel, liquid, or air. Among those, the transparent medium 117 is preferably a solid or gel (e.g., transparent resin). In the configuration in which the transparent medium 117 is a solid or a gel, even when the optical module 500 is immersed in the liquid, the liquid does not flow into the optical path until the light emitted from the first optical waveguide 104 is incident on the second optical waveguide 106. Therefore, the photoelectric hybrid module mounted with the optical module 500 according to the fifth embodiment can be efficiently cooled by immersion cooling.

Sixth Embodiment

Figure 6:
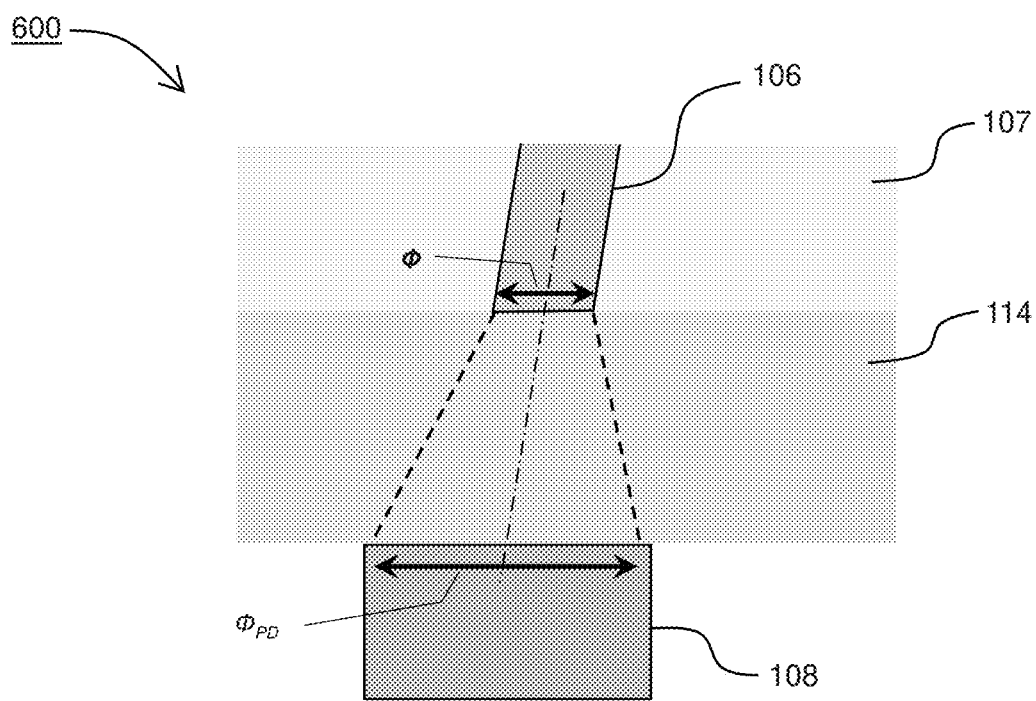
FIG. 6 is a cross-sectional configuration view of an optical module 600 according to a sixth embodiment of the present invention.

FIG. 6 is a cross-sectional configuration view of an optical module 600 according to a sixth embodiment of the present invention. In FIG. 6, the same components as those of the first embodiment are denoted by the same reference numerals. FIG. 6 is an enlarged view illustrating the end of the second optical waveguide 106 on the substrate 102 side and the vicinity of the light-receiving element 108. The configuration of the present embodiment can be applied to the respective optical modules of the first to fifth embodiments described above.

As illustrated in FIG. 6, the end of the second optical waveguide 106 on the substrate 102 side is located on the upper surface of the UV absorbing film 114, and light propagated in the second optical waveguide 106 toward the substrate 102 side and emitted from the end passes through the UV absorbing film 114 and is incident on the light-receiving element 108. The refractive index of the UV absorbing film 114 is generally smaller than the refractive index of the second optical waveguide 106, and hence the spot size of the light emitted from the end of the second optical waveguide 106 spreads as the light proceeds in the UV absorbing film 114. When the spot size of the light emitted from the second optical waveguide 106 on the light-receiving element 108 is larger than the light-receiving surface of the light-receiving element 108, a part of the light does not enter the light-receiving element 108 to cause a decrease in the light-receiving efficiency.

In order to prevent the decrease in light-receiving efficiency due to the spread of the spot size in the UV absorbing film 114, the diameter of the end of the second optical waveguide 106 on the substrate 102 side (i.e., the diameter of the narrowest portion of the tapered structure) is formed to be smaller than the light-receiving diameter of the light-receiving element 108 (i.e., the diameter of a window through which light can be taken in). Thereby, the spot size of the light emitted from the second optical waveguide 106 on the light-receiving element 108 is smaller than that in the configuration in which the diameter of the end of the second optical waveguide 106 on the substrate 102 side is the same as the light-receiving diameter of the light-receiving element 108, and the decrease in the light-receiving efficiency can be prevented.

More preferably, a diameter $\phi$ of the end of the second optical waveguide 106 on the substrate 102 side is set such that the spot size of the light emitted from the second optical waveguide 106 on the light-receiving element 108 is the same or substantially the same as a light-receiving diameter $\phi_{PD}$ of the light-receiving element 108. As a result, the light-receiving element 108 can receive the light emitted from the second optical waveguide 106 entirely, and the decrease in the light-receiving efficiency can be prevented.

Seventh Embodiment

Figure 7:
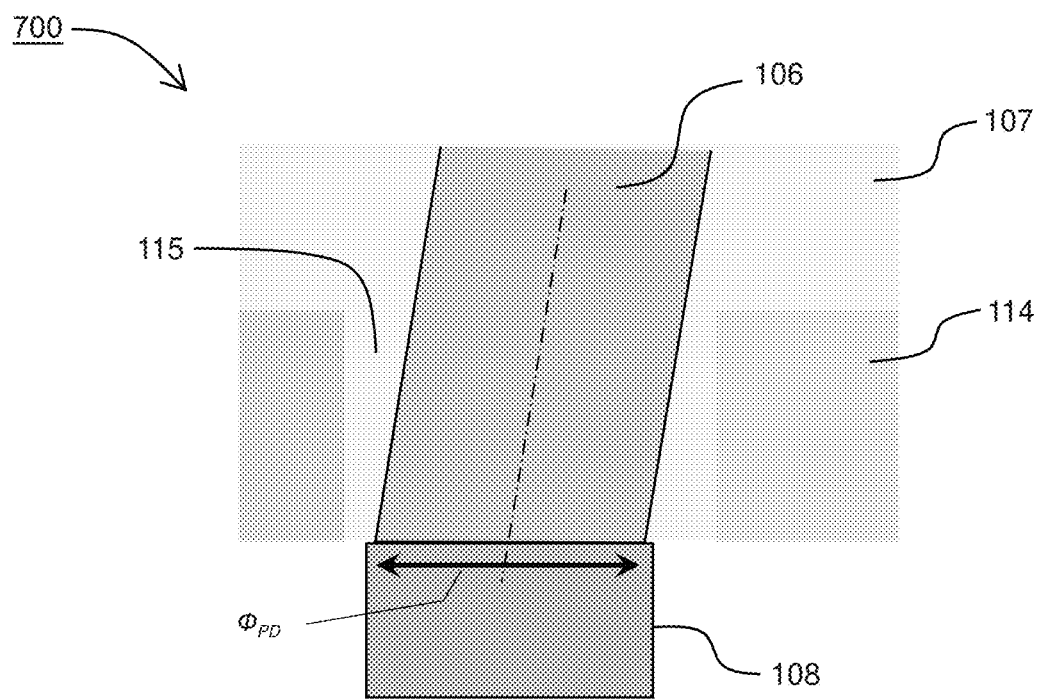
FIG. 7 is a cross-sectional configuration view of an optical module 700 according to a seventh embodiment of the present invention.

FIG. 7 is a cross-sectional configuration view of an optical module 700 according to a seventh embodiment of the present invention. In FIG. 7, the same components as those of the first embodiment are denoted by the same reference numerals. FIG. 7 is an enlarged view illustrating the end of the second optical waveguide 106 on the substrate 102 side and the vicinity of the light-receiving element 108. The configuration of the present embodiment can be applied to the respective optical modules of the first to fifth embodiments described above.

As illustrated in FIG. 7, the UV absorbing film 114 has a hole 115 on the top of the light-receiving element 108. The diameter of the hole 115 is substantially the same as or slightly larger than the light-receiving diameter of the light-receiving element 108. The end of the second optical waveguide 106 on the substrate 102 side is brought into the hole 115 provided in the UV absorbing film 114 and is in contact with the surface (light-receiving surface) of the light-receiving element 108. Note that a very thin film (e.g., 1 μm or less) may exist between the surface of the light-receiving element 108 and the tip of the second optical waveguide 106. The hole 115 may be a recess that does not penetrate the UV absorbing film 114. The recess 115 preferably has a depth of, for example, half or more of the thickness of the UV absorbing film 114.

With such a configuration, light emitted from the end of the second optical waveguide 106 is incident on the light-receiving element 108 directly or via a thin film (e.g., a thin portion of the UV absorbing film 114 remaining at the bottom of the recess 115). It is thus possible to prevent or reduce the spread of the spot size of the emitted light on the light-receiving element 108, thereby preventing the decrease in the light-receiving efficiency.

Note that the holes or recesses 115 of the UV absorbing film 114 can be formed by, for example, applying photolithography or laser ablation processing to the UV absorbing film 114 prior to forming the second optical waveguide 106 on the substrate 102. As described above, the UV absorbing film 114 is provided to avoid the curing of an unintended portion of the UV curable resin due to the reflection of the UV light beam from the substrate 102 at the time of producing the second optical waveguide 106. However, even when the UV absorbing film 114 is not provided in the portion of the hole 115, the purpose of the UV absorbing film 114 is not impaired because the UV reflected light from the substrate 102 is absorbed by the UV absorbing film 114 around the hole 115.

Eighth Embodiment

Figure 8:
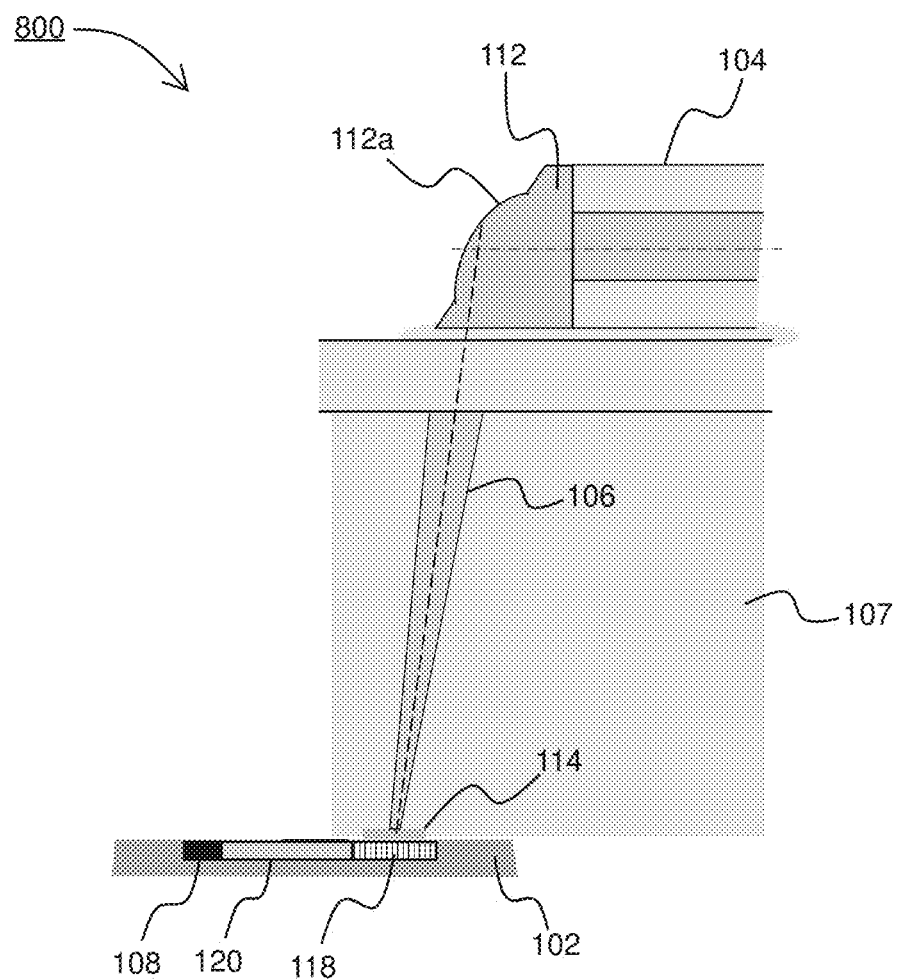
FIG. 8 is a cross-sectional configuration view of an optical module 800 according to an eighth embodiment of the present invention.

FIG. 8 is a cross-sectional configuration view of an optical module 800 according to an eighth embodiment of the present invention. In FIG. 8, the same components as those of the first embodiment are denoted by the same reference numerals. The present embodiment provides a modification to the first to seventh embodiments described above.

The optical module 800 includes a grating coupler 118 instead of the light-receiving element 108 below the end of the second optical waveguide 106 on the substrate 102 side. The grating coupler 118 is an example of an optical function unit different from the light-receiving element 108 in the first to seventh embodiments. The grating coupler 118 is connected to a third optical waveguide 120 (e.g., Si waveguide), and the light-receiving element 108 is disposed at the other end of the third optical waveguide 120. The grating coupler 118, the third optical waveguide 120, and the light-receiving element 108 are formed on the surface of the substrate 102.

The light emitted from the end of the second optical waveguide 106 on the substrate 102 side is diffracted by a grating coupler 118, propagates through the third optical waveguide 120, and is incident on the light-receiving element 108. The light-receiving element 108 is a waveguide type photodiode in which a light incident direction is parallel to a light absorption layer (in contrast, the light-receiving element 108 in each of the first to seventh embodiments is a planar type photodiode in which the light incident direction is vertical to the light absorption layer). The optical module 800 of the present embodiment also exhibits the same effect as those of the first to seventh embodiments.

Ninth Embodiment

Figure 9:
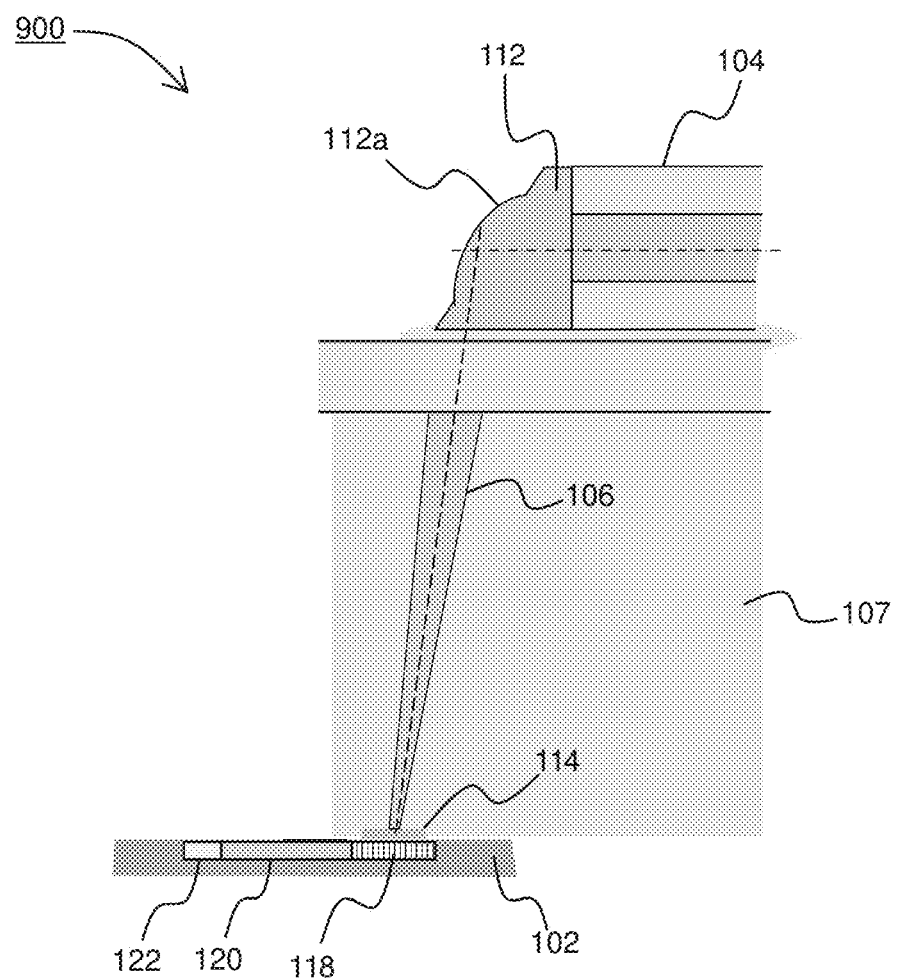
FIG. 9 is a cross-sectional configuration view of an optical module 900 according to a ninth embodiment of the present invention.

FIG. 9 is a cross-sectional configuration view of an optical module 900 according to a ninth embodiment of the present invention. In FIG. 9, the same components as those of the eighth embodiment are denoted by the same reference numerals. The present embodiment provides a further modification to the eighth embodiment.

The optical module 900 includes a semiconductor laser 122 instead of the light-receiving element 108 disposed at the other end of the third optical waveguide 120. In the optical module 900 of the present embodiment as well, it is possible to enhance the optical coupling efficiency between the optical function unit (grating coupler 118) and the first optical waveguide 104.

Although the embodiments of the present invention have been described above, the present invention is not limited thereto, and various modifications can be made without departing from the scope of the invention.

REFERENCE SIGNS LIST 100 optical module
102 substrate
104 first optical waveguide
104a mirror
106 second optical waveguide
107 cladding layer
108 light-receiving element
112 prism
112a internal reflective surface
114 UV absorbing film
115 hole or recess
116 mirror
117 transparent medium
118 grating coupler
120 third optical waveguide
122 semiconductor laser

What is claimed is:

1. An optical module comprising:
   a first optical waveguide disposed parallel to a substrate;
   a condensing mirror configured to reflect and condense light propagated in the first optical waveguide toward the substrate;
   a second optical waveguide that guides the light reflected by the condensing mirror to a vicinity of a surface of the substrate, the second optical waveguide having a first end on the first optical waveguide side and a second end on the substrate side, the first end having a first diameter and the second end having a second diameter that is smaller than the first diameter, and the second optical waveguide formed in a tapered shape gradually narrowing from the first end to the second end; and
   an optical function unit disposed on the substrate such that the light emitted from the second optical waveguide is incident on the optical function unit.

2. The optical module according to claim 1, wherein the condensing mirror is a mirror formed on an end face of the first optical waveguide.

3. The optical module according to claim 2, wherein the condensing mirror is a mirror having the end face of the first optical waveguide as a total reflective surface.

4. The optical module according to claim 1, wherein the condensing mirror is an internal reflective surface of a prism disposed in contact with an emitting end face of the first optical waveguide.

5. The optical module according to claim 2, wherein a metal film or a dielectric film is provided between the condensing mirror and air.

6. The optical module according to claim 1, wherein
   the condensing mirror is disposed away from the emitting end face of the first optical waveguide, and
   a space between the condensing mirror and the emitting end face of the first optical waveguide is filled with a transparent solid medium.

7. The optical module according to claim 1, further comprising a transparent film on the substrate,
   wherein
   the second optical waveguide is erected vertically or obliquely to a surface of the substrate,
   the optical function unit is a light-receiving element,
   light emitted from the second optical waveguide is incident on the light-receiving element via the transparent film, and
   a diameter of the end of the second optical waveguide on the substrate side is smaller than an effective light-receiving diameter of the light-receiving element.

8. The optical module according to claim 7, wherein the diameter of the end of the second optical waveguide on the substrate side is set such that a spot size of light emitted from the end on the light-receiving element is the same or substantially the same as the effective light-receiving diameter of the light-receiving element.

9. The optical module according to claim 7, wherein the transparent film is an ultraviolet (UV) absorbing film.

10. The optical module according to claim 1, further comprising a transparent film on the substrate,
    wherein
    the second optical waveguide is erected vertically or obliquely to the surface of the substrate,
    the optical function unit is a light-receiving element,
    the transparent film has a hole or a recess in a portion corresponding to the light-receiving element, and
    the end of the second optical waveguide on the substrate side is brought into the hole or the recess of the transparent film.

* * * * *